US006980549B1

(12) United States Patent
Shabtay et al.

(10) Patent No.: US 6,980,549 B1
(45) Date of Patent: Dec. 27, 2005

(54) POLICY ENFORCING SWITCH

(75) Inventors: Lior Shabtay, Ganei Tikva (IL); Benny Rodrig, Lexington, MA (US)

(73) Assignee: Avaya Technology Corp., Basking Ridge, NJ (US)

( * ) Notice: Subject to any disclaimer, the term of this patent is extended or adjusted under 35 U.S.C. 154(b) by 830 days.

(21) Appl. No.: 09/653,656

(22) Filed: Sep. 1, 2000

(51) Int. Cl.[7] .............................................. H04L 12/28
(52) U.S. Cl. ...................................... 370/392; 370/401
(58) Field of Search ............................... 370/400, 401, 370/402, 389, 392

(56) References Cited

U.S. PATENT DOCUMENTS

| | | | | |
|---|---|---|---|---|
| 5,920,566 A | * | 7/1999 | Hendel et al. ............... | 370/401 |
| 5,920,699 A | * | 7/1999 | Bare ......................... | 709/225 |
| 5,920,705 A | * | 7/1999 | Lyon et al. .................. | 709/240 |
| 5,938,736 A | * | 8/1999 | Muller et al. ............... | 709/243 |
| 5,978,951 A | * | 11/1999 | Lawler et al. ............... | 714/758 |
| 6,101,188 A | * | 8/2000 | Sekine et al. ................ | 370/401 |
| 6,157,644 A | * | 12/2000 | Bernstein et al. ........... | 370/392 |
| 6,262,988 B1 | * | 7/2001 | Vig ............................. | 370/401 |
| 6,553,028 B1 | * | 4/2003 | Tang et al. .................. | 370/389 |
| 6,628,655 B1 | * | 9/2003 | Fieschi et al. ............... | 370/389 |
| 6,636,509 B1 | * | 10/2003 | Hughes ....................... | 370/389 |
| 6,674,769 B1 | * | 1/2004 | Viswanath ................... | 370/469 |
| 6,807,172 B1 | * | 10/2004 | Levenson et al. ........... | 370/389 |
| 6,842,453 B1 | * | 1/2005 | Kloth et al. ................. | 370/392 |

OTHER PUBLICATIONS

"IEEE Standards for Local and Metropolitian Area Networks: Virtual Bridged Local Area Networks";Std 802.IQ; Dec. 1998.
"Management Information Base for Network Management of TCP/IP-based internets: MIB-11"; RFC 1213; Mar. 1991.
"A Simple Network Management Protocol (SNMP)"; RFC 1157; May 1990.
"Layer 3 Switches"; InfoWorldMagazine; vol. 20; Issue 22; Jun. 1, 1998.
"Gigabit Info Center - Improving Performance";http://www.foundrynet.com/wpvo13.htm.
"Switches: Switch Node"; http://www.baynetworks.com/Products/Switches/2720.htm.
"An Ethernet Address Resolution Protocol—or — Converting Network Protocol Addresses to 48.bit Ethernet Address for Transmission on Ethernet Hardware"; RFC 826; Nov. 1982.
"Internet Protocol"; RFC 791; Sep. 1981.
"Requirementsfor IP Version 4 Routers"; RFC 1812; Jun. 1995.
"MPOA Standard: Multi-ProtocolOver ATM Version 1.0"; AF-MPOA-0087.000; The ATM Forum Technical Committee; Jul. 1997.
"LAN Emulation Over ATM Version 2.0—LUNI Specification"; AF-LANE-0084.000;The ATM Forum Technical Committee; Jul. 1997.
"Information Technology—Telecommunicationsand Information Exchange Between Systems—Local and Metropolitan Area Networks—Common Specifications—Part 3: Media Access Control (MAC) Bridges"; ISO/IEC 15802-3: 1998 ANSI/IEEE Std 802.1D; 1998 Edition.
Cisco System Inc.; "Catalyst 6000 Family Accelerated Server Load Balancing"; http://www.cisco.com/warp/public/cc/pd/si/casi/ca6000/tech/aslb_wp.htmpps.1-14.

* cited by examiner

Primary Examiner—Min Jung

(57) ABSTRACT

A method of accelerating the routing of frames by an acceleration switch within a network. The method includes receiving, by the acceleration switch, frames directed to one of one or more routers or switches of the network, determining, for at least some of the received frames, whether the frames belong to a first list of frame groups, defined by values of a plurality of frame parameters, and routing, by the acceleration switch, at least some of the received frames, the routed frames being selected responsive to the determining.

41 Claims, 6 Drawing Sheets

POLICY ENFORCING SWITCH

FIELD OF THE INVENTION

The present invention relates to communication networks and in particular to switches of packet based networks.

BACKGROUND OF THE INVENTION

Packet based networks are formed of a plurality of layer-2 networks connected by routers. The layer-2 networks may include local area networks (LANs) metropolitan area networks (MANs), wide area networks (WANs) and simple links. For the simplicity of the following description the term LAN is used to represent all layer-2 networks, unless specifically stated otherwise. The routers receive packets from one LAN to which they are connected and pass the packets through the same or a different LAN in an operation referred to as routing. In the routing act, the router determines the LAN through which the packets are forwarded and selects a layer-2 MAC address with which the packet is forwarded on the determined LAN. The routing operation requires suitable configuration of the router in accordance with the computers and networks which the router services. Layer-3 switches are switches which perform the tasks of routers, in addition to layer-2 bridging tasks.

Some routers and layer-3 switches perform other tasks in addition to the routing. Some of these tasks, referred to cumulatively as policy enforcement, include, for example, access control, quality of service (QoS) determination, sniffing (i.e., passing certain packets to an additional station) and packet counting.

Router acceleration switches perform some of the routing which should be performed by one or more adjacent routers (i.e., routers included in the same layer-2 network). The routing is performed by the acceleration switch based on information sent within the LAN, e.g., to/from the adjacent router, and the acceleration switch does not require configuration in order to perform the routing. The acceleration switch intercepts packets, which it knows how to route, on their way to the adjacent router and routes them directly to their destination or to a next hop on their way to their destination. Packets which the acceleration switch does not know how to route are bridged in layer-2 to the adjacent router. Thus, the packets routed by the acceleration switch do not reach the adjacent router, the load on the adjacent router is reduced and the throughput of the network is increased. These advantages are referred to as router acceleration and the adjacent router is referred to as the accelerated router.

Generally, in order to operate in a policy enforcement environment the policy rules must be configured into the acceleration switch. This, however, reduces the effect of an advantage of acceleration switches, which is that acceleration switches do not require configuration.

SUMMARY OF THE INVENTION

An aspect of some embodiments of the present invention relates to a router acceleration switch which learns how to route packets based on packets already routed by the accelerated router.

An aspect of some embodiments of the present invention relates to an acceleration switch which only routes certain types of packets if they belong to a common group (identified by a plurality of common parameters) with one or more packets recently routed by the accelerated router. In some embodiments of the invention, the common groups are ones which substantially always require the same policy enforcement. Thus, the acceleration switch will not route packets which should be discarded, according to access control rules in the accelerated router. Furthermore, the acceleration switch may learn the quality of service (QoS) which should be tagged to the routed packets.

In some embodiments of the invention, the acceleration switch listens to packets transmitted to and received from the accelerated router. The acceleration switch optionally matches packets headed to the accelerated router with packets, of a common group, received from the accelerated router. In some embodiments of the invention, the acceleration switch routes only packets of groups from which matching packets to and from the accelerated router were received by the acceleration switch.

In some embodiments of the invention, the acceleration switch manages a list of the packet groups which are to be routed by the acceleration switch. In some embodiments of the invention, the packet groups are identified by their source and destination IP addresses, the protocol of the payload of the packets and the source and destination ports of the packet if the protocol includes such ports. Optionally, for each group, the list indicates the QoS with which the packet should be forwarded.

In some embodiments of the invention, the acceleration switch may be configured with the parameters that define packet groups. For example, one definition may define groups only according to source and/or destination IP addresses while another definition may define groups according to the protocol and source and destination IP addresses and ports.

An aspect of some embodiments of the invention relates to an acceleration switch which determines whether (and how) to route packets differently for different types of packets. In some embodiments of the invention, different sets of parameters are used for different types of packets in determining the group to which the packets belong. In some embodiments of the invention, for example, packets of a first type are routed based on groups defined by a plurality of parameters (e.g., protocol, and source and destination IP addresses and ports) and packets of a second type are routed based on groups defined solely by the IP destination address.

In some embodiments of the invention, the second type of packets comprises non-leading packets of connection based protocols and/or UDP packets directed to ephemeral (i.e., not assigned to a specific application) ports. These packets generally do not require access control since they normally are not sent unless previous packets which are checked for access control were routed.

In some embodiments of the invention, the different types of packets differ according to the VLAN to which they belong and/or the physical port through which they are received.

There is therefore provided in accordance with an embodiment of the invention, a method of accelerating the routing of frames by an acceleration switch within a network, including receiving, by the acceleration switch, frames directed to one of one or more routers or switches of the network, determining, for at least some of the received frames, whether the frames belong to a first list of frame groups, defined by values of a plurality of frame parameters, and routing, by the acceleration switch, at least some of the received frames, the routed frames being selected responsive to the determining.

Optionally, receiving frames directed to one of one or more routers or switches includes receiving frames which have a layer-2 destination address of one of the one or more routers or switches. In some embodiments, routing the at least some of the received frames includes routing the frames based on, substantially only, the destination addresses of the frames. Alternatively or additionally, routing the at least some of the received frames includes routing the received frames using information in an entry of the first list of frame groups which matches the routed frame. Optionally, routing at least some of the received frames includes routing frames which were determined to belong to a group in the first list. Optionally, the method includes bridging frames which were determined not to belong to a group in the first list according to their layer-2 information. In some embodiments, determining for at least some of the received frames includes determining for substantially all the received frames. Alternatively, determining, for at least some of the received frames includes determining for frames which may require access control. Optionally, determining, for at least some of the received frames includes determining for frames of a connectionless protocol and/or directed to well known UDP ports. Optionally, the first list of frame groups includes a list of groups which include frames routed by one or more routers or switches of the network. In some embodiments, the first list of frame groups includes a list of groups which include frames recently routed by one or more routers or switches of the network. Optionally, the first list of frame groups includes information extracted from frames having as their layer-2 source and/or destination address an address of one of the one or more routers or switches.

In some embodiments, the first list of frame groups lists only groups including frames transmitted to and received from the one or more routers or switches. Optionally, the plurality of parameters which define the frame groups comprise at least two parameters not required in order to perform the routing and/or at least one parameter in addition to the IP destination address. Optionally, the plurality of parameters which define the frame groups comprise the source port, destination port and/or protocol of the frames.

In some embodiments, the method includes determining, for at least some of the received frames, whether the frames belong to a group in at least one additional list of frame groups and routing, by the acceleration switch, at least some of the received frames, the routed frames being selected responsive to the determining of whether the frames belong to a group in the at least one additional list.

Optionally, the groups of the at least one additional list are defined by one or more parameters required for routing the frames. Optionally, the one or more parameters which define the groups of the at least one additional list comprise only a destination address of the frames. Optionally, determining, for at least some of the received frames, whether the frames belong to a group in the at least one additional list includes determining for frames which do not require access control, for non-leading frames of a connection based protocol and/or for frames directed to any of a predetermined group of ports. In some embodiments, the one or more parameters defining the groups of the at least one additional list are not the same parameters as the plurality of parameters which define the groups of the first list.

Optionally, at least some of the received frames are compared to the first list to determine whether the frame belongs to a group in the first list and if no match is found are compared to the at least one additional list. Optionally, the acceleration switch compares the received frames to one of the first or at least one additional lists. In some embodiments, the acceleration switch determines to which list to compare the received frames responsive to the physical port through which they are received by the switch, the protocol to which they relate, and/or the router or switch to which they are directed.

Optionally, routing the at least some of the received frames responsive to the determining of whether the frames belong to a group in the at least one additional list includes routing the received frames using information in an entry of the additional list of frame groups which matches the routed frame.

There is further provided in accordance with an embodiment of the invention, a method of accelerating the routing of frames by an acceleration switch within a network, including providing, in the acceleration switch, a plurality of lists of groups of frames used for routing, receiving, by the acceleration switch, frames directed to one of one or more routers or switches of the network, comparing at least one of the received frames to at least one of the plurality of lists, and routing, by the acceleration switch, received frames for which a match was found in the comparison.

Optionally, providing the plurality of lists includes providing lists which use different sets of parameters in defining groups of frames. In some embodiments, comparing at least one of the received frames to at least one of the plurality of lists includes comparing at least one of the received frames to a plurality of the lists. Alternatively or additionally, determining to which of the at least one of the plurality of lists to compare each frame responsive to the value of one or more fields of the frame.

There is further provided in accordance with an embodiment of the invention, an acceleration switch, including at least one table which lists groups of frames defined by a plurality of parameters of the frames, a table trainer which creates entries in the at least one table responsive to frames received by the switch, a comparator which determines whether the frames belong to one of the groups in one or more of the at least one table, and a routing unit which routes frames directed to at least one router or routing switch for which the comparator found a matching group in the one or more of the at least one table.

Optionally, the table trainer creates entries in the at least one table responsive to frames received from the at least one router or routing switch. Optionally, the table trainer selects frames to be used in creating entries in the at least one table responsive to at least the source MAC address of the frames and/or irrespective of the destination MAC address of the frames.

In some embodiments, the at least one table includes a plurality of tables which define groups of frames based on different sets of one or more parameters of the frames.

Optionally, the comparator selects the one or more of the at least one table to which a frame is compared responsive to a type of the frame. Optionally, the type of the frame is determined responsive to a protocol of the frame and/or a VLAN of the frame. There is further provided in accordance with an embodiment of the invention, a communication network, including at least one router; and at least one router acceleration switch.

There is further provided in accordance with an embodiment of the invention, a method for creating an acceleration routing table, including receiving frames which include routing data, determining, responsive substantially only to information within the received frames, whether frames routed based on the routing data of the received frames may violate policy rules; and creating entries in an acceleration routing table based on routing data which may not cause violation of policy rules according to the determination, entries are not created based on routing data which may cause violation of policy rules according to the determination.

Optionally, determining whether frames routed based on the routing data may violate policy rules includes determining whether the received frames carrying the routing data were routed by a neighboring router. Optionally, determining whether frames routed based on the routing data may violate policy rules includes determining that frames routed based on the routing data will not violate policy rules for frames which were routed by a neighboring router.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
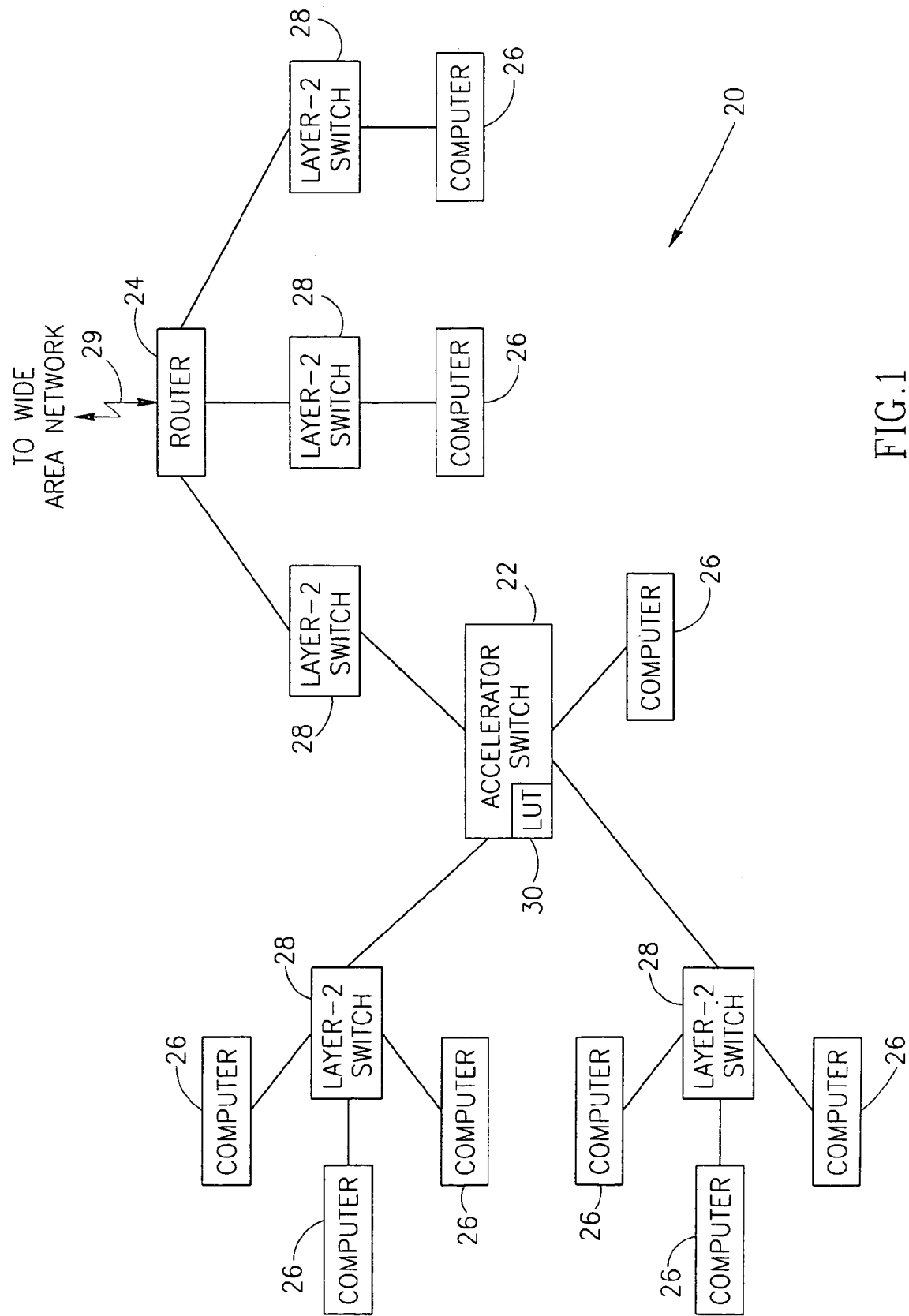
FIG. 1 is a schematic block diagram of a local area network illustrating the operation of an accelerator switch, in accordance with an embodiment of the present invention.

FIG. 1 is a schematic block diagram of a local area network 20 illustrating the operation of an accelerator switch 22, in accordance with an embodiment of the present invention. Network 20 generally comprises a plurality of computers 26 (or other end devices) connected through links by layer-2 switches 28. In an embodiment of the invention, both switches 22 and switches 28 comprise 802.1+802.3 Ethernet switches. Layer-2 switches 28 distribute data frames throughout a single local area network (LAN) or a single virtual LAN (VLAN). A router 24 performs layer-3 routing between LANs and/or VLANs to which router 24 is connected. Optionally, router 24 connects to a wide area network, such as the Internet, through a link 29. Alternatively to router 24, network 20 may include a layer-3 switch which performs both layer-2 bridging and layer-3 routing, as is known in the art. A network manager configures router 24 with routing information and policy enforcement rules of network 20. It is noted that network 20 is shown for illustration purposes only and various embodiments of the invention may be implemented in substantially any network configuration.

Accelerator switch 22 comprises a layer-3 switch which performs layer-2 bridging similarly to layer-2 switches 28, and layer-3 routing of some of the frames which are directed to router 24, referred to herein as the accelerated router. Thus, accelerator switch 22 reduces the data traffic load on router 24. Generally, accelerator switch 22 does not require configuration of routing and policy enforcement rules. Alternatively, counting and/or sniffing enforcement rules, if required, are configured into accelerator switch 22 by the network manager and/or are transmitted to accelerator switch 22 from router 24, for example, in a manner similar to the transfer of routing rules described in U.S. patent application Ser. No. 09/132,030, the disclosure of which is incorporated herein by reference.

In some embodiments of the invention, accelerator switch 22 comprises a look up table which identifies groups of frames which are to be routed by switch 22. In some embodiments of the invention, the groups of frames have a common policy and routing behavior.

Figure 2:
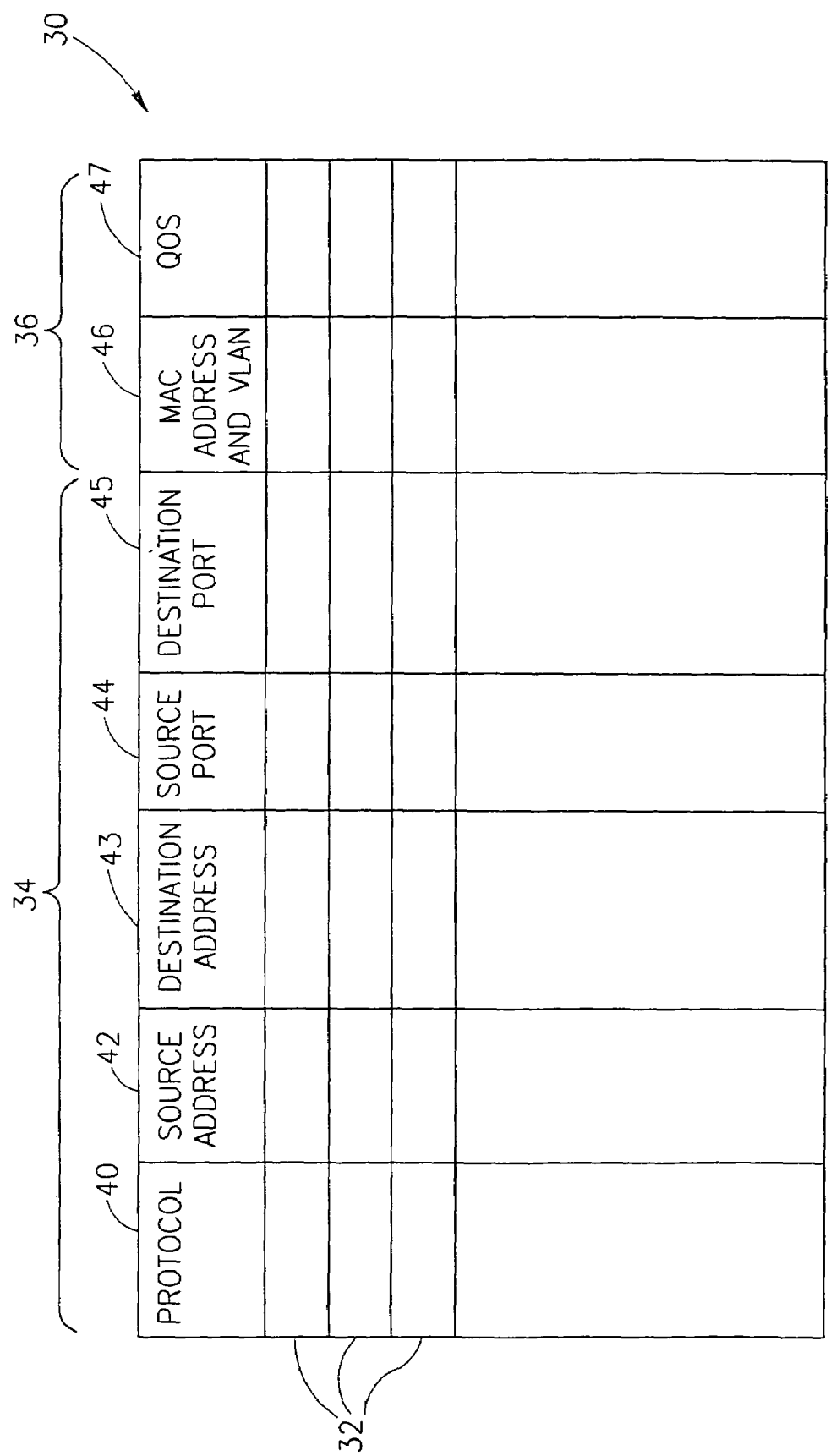
FIG. 2 is a schematic illustration of look up table of an accelerator switch, in accordance with an embodiment of the present invention.

FIG. 2 is a schematic illustration of look up table 30, in accordance with an embodiment of the present invention. Table 30 comprises a plurality of entries 32 which include representative key fields 34 which identify frame groups, and result fields 36 which include information for routing of frames of the group. In some embodiments of the invention, key fields 34 include at least one parameter not required in order to perform routing. In some embodiments of the invention, key fields 34 include a set of parameters, such that a group of frames identified by an entry 32 will always (or in most cases) receive the same policy by router 24. In an exemplary embodiment of the present invention, key fields 34 include a protocol field 40, source and destination IP address fields 42 and 43, and source and destination port fields 44 and 45. In some embodiments of the invention, key fields 34 also include one or more higher layer protocol fields (for those packets matching the protocol), for example, tunneling fields, virtual private network (VPN) fields and/or URL fields. In another exemplary embodiment of the present invention, key fields 34 include only source and destination IP address fields 42 and 43.

The fields in FIG. 2 are shown by way of example, and additional or alternative fields (e.g., a QoS (DSCP/ToS) field) may be included in key fields 34 in accordance with the present invention. Furthermore, in some embodiments, key fields 34 may include less fields, for example, only protocol field 40 and IP address fields 42 and 43 or protocol field 40 and port fields 44 and 45. In some embodiments of the invention, some entries 32 which represent sessions of protocols for which one or more key fields 34 are inapplicable may be assigned arbitrary values, which match all frames, for these key fields.

In some embodiments of the invention, entries representing groups of packets for which one or more of the fields do not apply, e.g., port fields 44 and 45 for ICMP packets, are given "don't care" values in these fields.

In some embodiments of the invention, result fields 36 include a MAC address and VLAN field 46 to which the frames matching the entry should be routed and a QoS field 47 which lists the QoS with which the frames should be routed. In an embodiment of the invention, key fields 34 include a field which states a layer-3 IP QoS value and QoS field 47 states a respective layer-2 QoS value to be assigned to the matching frames.

In some embodiments of the invention, table 30 comprises an aging field 49 which is used to keep track of the time in which each entry 32 are kept in table 30. Optionally, aging field 49 keeps track of the time in which the respective entry was created. Alternatively or additionally, aging field 49 keeps track of the most recent time in which the entry was used. Further alternatively or additionally, aging field 49 states whether a frame with a FIN flag was received and/or the time at which the frame with the FIN flag was received.

The FIN flag signals that the connection to which the frames of the entry belong is being closed.

Figure 3:
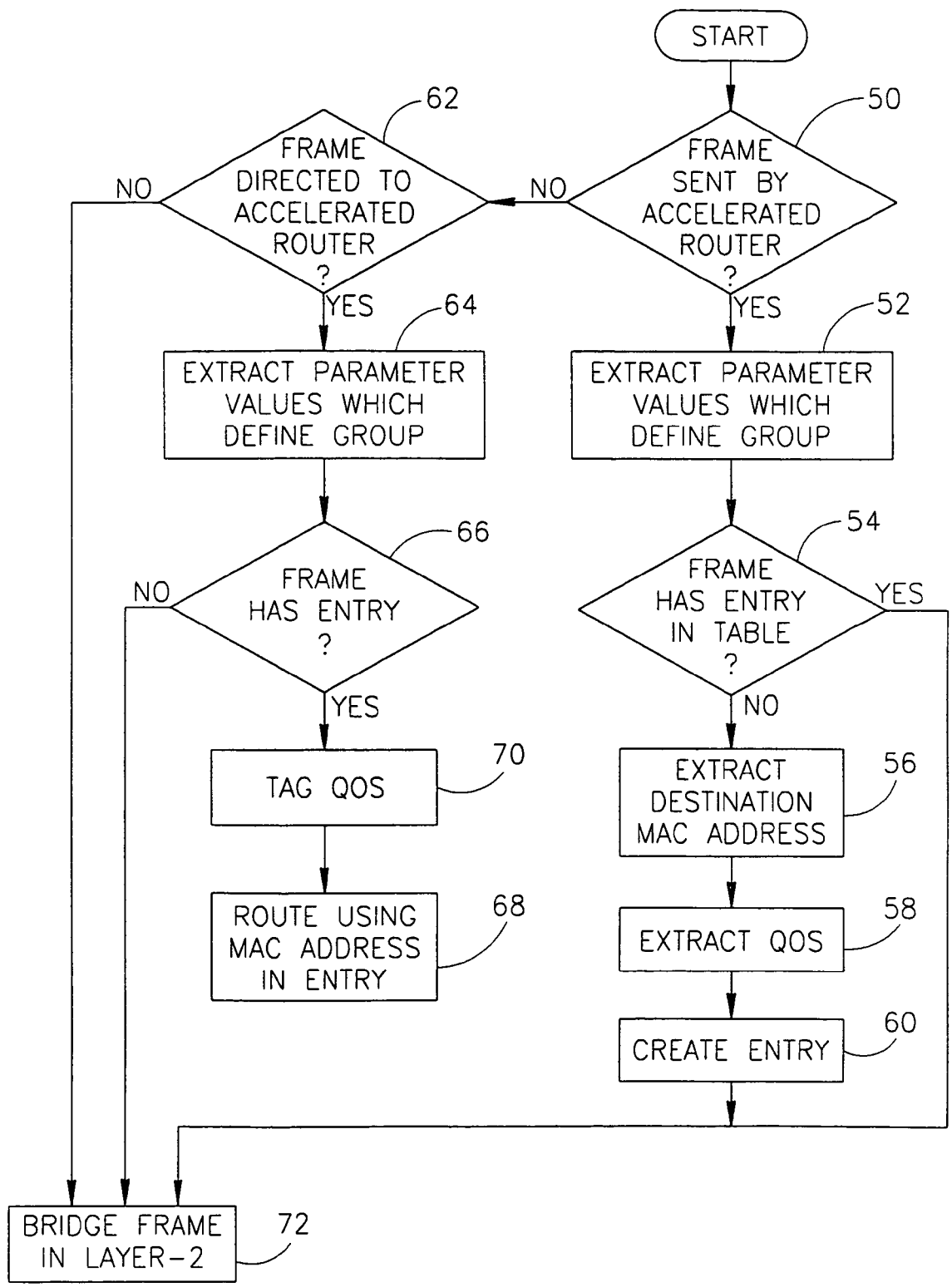
FIG. 3 is a flowchart of the actions performed by an accelerator switch, in accordance with an embodiment of the present invention.

FIG. 3 is a flowchart of the actions performed by accelerator switch 22, in accordance with an embodiment of the present invention. Switch 22 monitors the contents of the frames which it bridges in layer-2. For each frame, switch 22 determines the layer-2 source and/or destination of the frame, for example, according to the layer-2 MAC source and/or destination addresses and/or VLAN of the frame. In some embodiments of the invention, if (50) the frame was sent from accelerated router 24, switch 22 extracts (52) from the frame, values of one or more parameters which identify the group to which the frame belongs. Optionally, switch 22 checks whether (54) the frame's group has an entry in table 30 of the switch. If the frame's group does not have an entry, switch 22 extracts (56) the destination MAC address to which the frame is directed and/or the VLAN of the frame, and creates (60) an entry 32 in table 30 listing the values of the parameters of the frame's group (in key field 34) and the destination MAC address and VLAN in field 46. Optionally, switch 22 also extracts (58) the layer-2 (802.1P) QoS of the frame and/or the layer-3 QoS, i.e., the TOS or DSCP fields of the frame, and includes them in the QoS field 47 and/or in a QoS key field of the created entry 32. Preferably, the frame is bridged towards its destination after, while or before the entry is created.

If (62) the frame is directed to accelerated router 24, switch 22 extracts (64) the one or more parameters which identify the frame's group and determines (66) whether an entry 32 which matches the frame exists in table 30. If a matching entry 32 exists, the frame is routed (68) by switch 22. Optionally, switch 22 tags (70) the QoS 47 of the matching entry 32 to the routed frame. Thus, frames are routed only if they adhere to the policy access rules of accelerated router 24 and optionally with the QoS which router 24 would give them. Frames for which an entry does not exist are bridged toward router 24.

Frames which do not carry both the MAC address and the VLAN of the accelerated router, as either source or destination, are bridged (72) in accordance with the normal layer-2 bridging procedure. It is noted that router 24 may have a plurality of different pairs of MAC addresses and VLANs. Optionally, switch 22 relates to some or all of the pairs of MAC addresses and VLANs of router 24.

Referring in more detail to routing (68) the frame which has a matching entry, in some embodiments of the invention, the routing is performed using the destination MAC address and VLAN field 46 in the matching entry. Thus, it does not matter whether server 24 performs routing only based on the IP destination address of the packet or router 24 performs routing based on additional parameters included in the key fields of table 30.

Alternatively, switch 22 comprises a separate table which correlates between destination IP addresses and respective destination MAC addresses and VLAN fields, instead of using field 46 of table 30. This alternative reduces the storage space required for storing table 30 (generally, even taking into consideration the storage space of the separate table) and is suitable for cases in which the routing performed by router 24 is performed based on, substantially only, the destination IP address of the frame, i.e., the frame is routed with a destination MAC address and a VLAN selected only based on the destination IP address of the frame. When an entry in table 30 is created, switch 22 checks whether the destination IP address of the frame has a respective entry in the separate table. If an entry is not found, a new entry in the additional table is created based on the information in the frame. When a frame with a matching entry is found, switch 22 refers to the separate table to determine the MAC address and VLAN to be used in the routing.

In some embodiments of the invention, switch 22 performs the tasks of bridging, routing and creating (60) entries in table 30 using one or more hardware fast path units. Alternatively, substantially all the tasks of switch 22 are performed by one or more software modules run on a processor of the switch. Further alternatively, switch 22 comprises a hardware fast path unit which performs the bridging tasks of the switch, and the task of creating (60) entries in table 30 is performed by a processor of switch 22. Optionally, in order not to overload the processor, the hardware unit transfers to the processor for the task of creating entries, only specific frames which may have information required for creating entries. In some embodiments of the invention, the specific frames transferred to the processor for creating entries in table 30 comprise frames which have as their source MAC address the address of router 24. In some embodiments of the invention, the determination of which frames are transferred to the processor for creating entries in table 30 is performed irrespective of the destination MAC addresses of the frames. Alternatively, the determination of which frames are transferred to the processor for creating entries in table 30 is performed based on both the source MAC address and the destination MAC address of the frames.

It is noted that the acts described in FIG. 3 may be performed in substantially any order and that some of the acts may be performed concurrently. Furthermore, some of the acts may be performed before the condition for their performance is fulfilled, in which case the results are used only if the condition is fulfilled. For example, the destination MAC address of the received frame may be extracted (56) before it is determined (54) whether a matching entry exists in the table.

Figure 4:
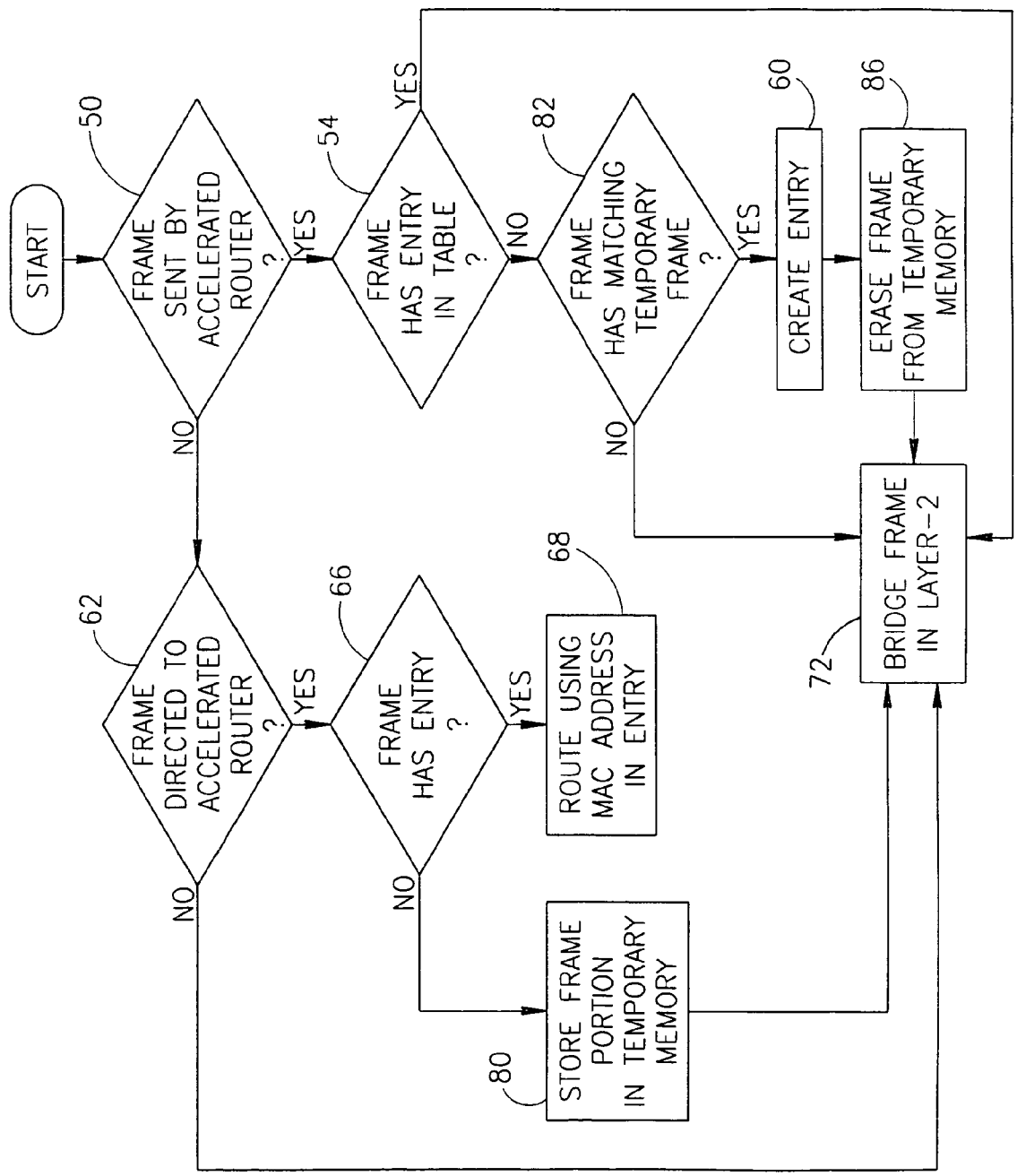
FIG. 4 is a flowchart of the actions performed by an accelerator switch, in accordance with another embodiment of the present invention.

FIG. 4 is a flowchart of the acts performed by accelerator switch 22, in accordance with another embodiment of the present invention. In the embodiment of FIG. 4, which is a more complex variation of FIG. 3, switch 22 determines (66) for frames directed to accelerated router 24 whether an entry which matches the frame exists in the table. If a matching entry does not exist, switch 22 stores (80) part or all of the frame in a temporary storage for comparison to frames received from accelerated router 24. Frames received from accelerated router 24 are compared (82) to the stored frames headed to router 24, and if a match is found an entry is created (60) for the frame's group.

In some embodiments of the invention, the storing (80) of frame portions in the temporary storage comprises storing the values of specific fields of the frames, which specific fields have relatively low probabilities of repeating unintentionally in two different frames. In some embodiments of the invention, the specific fields are taken from the various headers of the frames. In an exemplary embodiment of the invention, the specific fields include, for TCP packets, one or more of the sequence and acknowledge fields of the TCP header and the length of the packet. In an exemplary embodiment of the invention, the specific fields include, for HTTP packets, a URL field and/or a cookie field.

Alternatively or additionally, the storing (80) of frame portions in the temporary storage comprises storing random fields which are easy to compare and/or which have a low or no correlation between any two randomly selected frames passing through accelerator switch 22. In an exemplary embodiment of the invention, the random fields include a predetermined number, e.g., between 50–100, of leading and/or ending bytes. The leading bytes are counted from the beginning of the layer-2 frame, from the beginning of the IP packet, from after the IP header, from after the transport header or from after any other header. In some embodiments of the invention, a combination of one or more specific fields and of one or more random fields is used.

In some embodiments of the invention, the stored portions used for comparison do not include fields which may be changed by router 24, e.g., the VLAN and/or MAC address of the frame. Optionally, the stored portions used for comparison do not include fields which have the same value for a large number of frames, e.g., the IP header length and/or version.

It is noted that using the method of FIG. 4 prevents accelerator switch 22 from learning to route groups based on frames which did not pass through switch 22 on their way to router 24. Furthermore, the method of FIG. 4 allows using one or more parameters which may be changed by router 24, as key fields 34 of table 30. These parameters may be used because entries are created based on the packet directed to router 24 based on their matching to packets from router 24. It is noted that the values of the parameters used as key fields 34 are stored in the temporary storage with the portions of the frame stored for comparison purposes, so that they may be used if a match is found.

In an exemplary embodiment of the invention, key fields 34 include one or more layer-2 parameters of the packet, such as the source MAC address, the destination MAC address and/or the VLAN of the packet. Use of these parameters is desired when the policy enforcement rules of router 24 depend on these parameters.

In some embodiments of the invention, when a received packet directed to router 24 matches an entry in the temporary storage, the entry in the temporary storage is deleted and no entry is created for the received packet. Thus, switch 22 does not create routing entries in table 30 based on matching packets (from and to router 24) when the matching may be in error due to additional packets having identical stored portions are passing through the network.

In some embodiments of the invention, frame portions are stored for a predetermined time after which it is assumed that the frame was not routed by router 24 or was routed in a direction which does not pass through switch 22. Alternatively, when the temporary storage is filled the oldest entry is overwritten. When a match is found and an entry is created (60) in LUT 30 the frame is erased (86) from the temporary memory.

In some embodiments of the invention, switch 22 tags frames directed to router 24 with a unique identification number which is used to match the frames received on their way to router 24 with frames received on their way from router 24. The unique identification number may be tagged to the frames using various methods. In some embodiments of the invention, an additional field, e.g., an additional header or tail, including the unique identification number is added to the frames transmitted to router 24. Alternatively or additionally, an IP option field and/or a TCP option field which includes the unique identification number is added to the frame. Optionally, the additional field is not added to packets which are at the maximal length beyond which the frame must be fragmented.

In some embodiments of the invention, the unique identification number is placed within an existing field of the frames. Optionally, the unique identification number is placed in a reserved field which is not in use and is not altered by router 24, e.g., the reserved bits in the type of service (TOS) field of the IP header and/or the fragmentation field of the IP header in frames which do not include fragments. Optionally, when the fragmentation field is used to store the unique identification number, switch 22 does not change and does not learn from frames which were fragmented.

Alternatively or additionally, switch 22 replaces the value of one or more frame fields which may be in use e.g., the fragmentation field of the IP header, and returns the original value when the frames return on their way back. In some embodiments of the invention, switch 22 identifies whether the current value of the replaced field is required and stores the original value only if the value is required, e.g., the frame was actually fragmented.

In some embodiments of the invention, the unique identification number is added to the received frames only when switch 22 knows that all frames passing through switch 22 to router 24 must return back through switch 22. This may happen, for example, when router 24 is only connected through one or more ports of switch 22. In some embodiments of the invention, switch 22 removes the unique identification number when the frame returns from router 24. In some embodiments of the invention, a system manager configures switch 22 with notification on whether router 24 is only connected through switch 22. Alternatively or additionally, switch 22 keeps track of the IP destination addresses of frames it receives from router 24 and tags the unique identification number only to frames which have an IP destination address for which a frame was previously received from router 24.

Alternatively, the unique identification number does not alter the frame in a manner which bothers routers and/or hosts which are not aware of the meaning of the unique identification number and the unique identification number is left in the frame.

Figure 5:
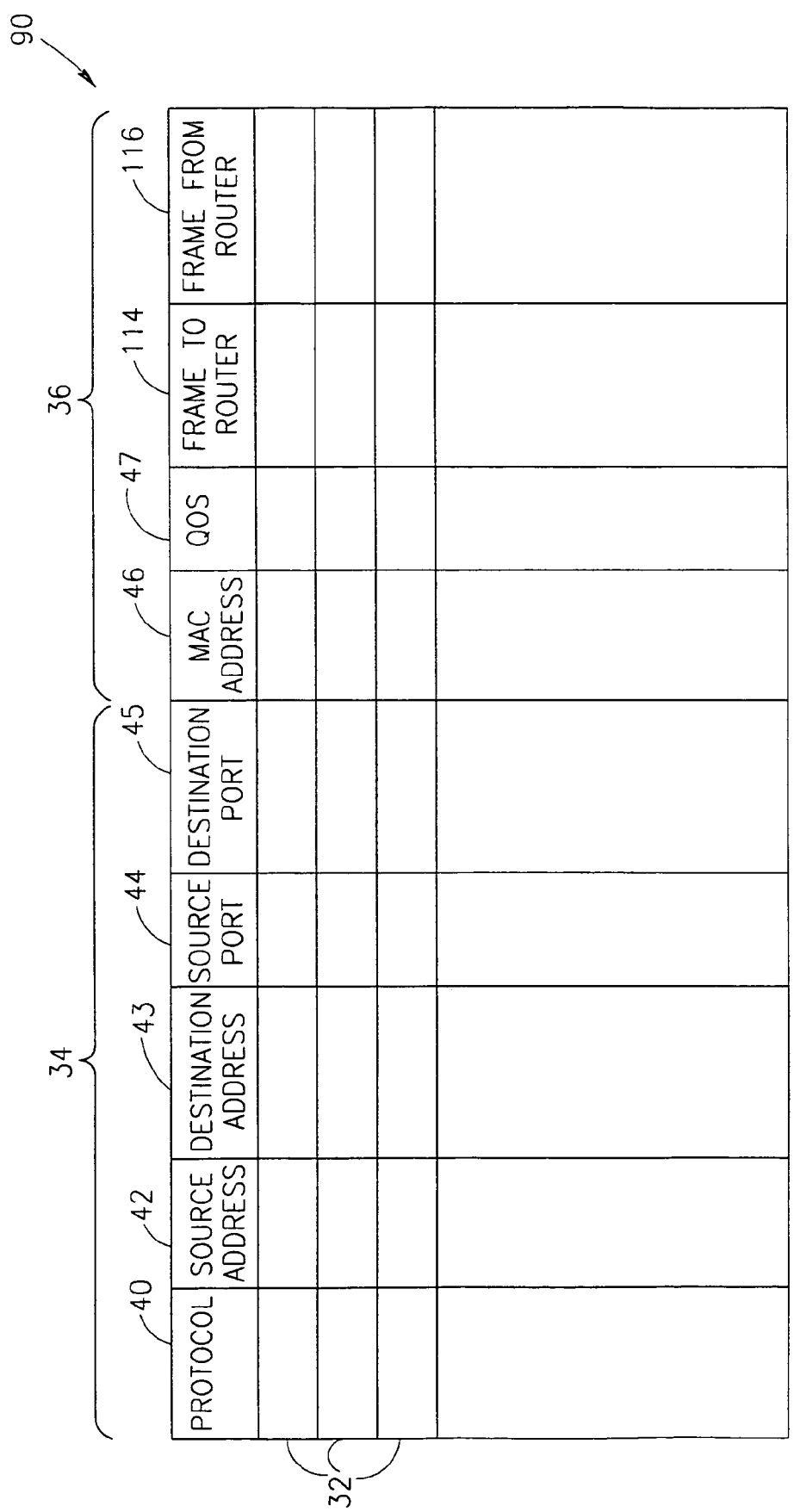
FIG. 5 is a schematic illustration of a routing look up table for use by an accelerator switch, in accordance with an embodiment of the present invention.

FIG. 5 is a schematic illustration of a routing look up table 90 for use by accelerator switch 22, in accordance with an embodiment of the present invention. Table 90 is similar to table 30 (FIG. 2) described above, however its result fields 36 include additionally two fields 114 and 116 which contain reception flags that indicate whether a frame matching the entry was received. Reception of a frame on its way to router 24 is indicated in field 114 and the reception of a frame from router 24 is indicated in field 116. Fields 114 and 116 serve a similar purpose as the temporary storage described above with reference to FIG. 4, however, they do not identify a specific frame but only that one or more frames matching the entry were received on their way to or from router 24.

In some embodiments of the invention, when a frame to or from router 24, which does not have a respective entry, is detected by switch 22, an entry is created for the group of the frame. The entry includes an indication in field 114 or 116 depending on whether the frame was on its way to or from router 24. When switch 22 detects a frame to or from router 24 in a direction for which an indication in fields 114 or 116 does not appear in a respective entry of the frame, the indication is added responsive to the detected frame. Frames to router 24 are routed by accelerator switch 22 only if the matching entry of the frame has indications in both of fields 114 and 116.

In some embodiments of the invention, fields 114 and 116 include binary (yes/no) indications of whether frames were received. Alternatively or additionally, fields 114 and 116 indicate the time at which the most recent matching frame was received. Further alternatively or additionally, fields 114 and 116 count the matching frames in the directions to and from router 24, respectively. Optionally, routing based on the entry is performed only when the count in field 114 and/or 116 is above a predetermined threshold.

In some embodiments of the invention, entries which have an indication in only one of fields 114 or 116 for a predetermined time, are erased. Optionally, the time warranting the erasing of an entry with an indication in only one of fields 114 and 116 is different, for example shorter, than for entries which have indications in both of fields 114 and 116.

In an embodiment of the invention, the entries of tables 30 and/or 90 are erased a predetermined time after their creation. Alternatively or additionally, entries are erased if they are not used for a predetermined time. In some embodiments of the invention, switch 22 tracks TCP frames in which the FIN bit (which indicates the end of a connection) is set and removes (optionally after a predetermined wait time, e.g., 30 seconds) the respective entry of those frames from the tables.

It is noted that the structures of table 30 and 90 shown in FIGS. 2 and 5 are brought by way of example and other table structures may be used. For example, the look up table of switch 22 may comprise a plurality of sub-tables which have different key fields 34. The different sub-tables are optionally used for frames of different categories, according to production and/or user settings. Alternatively or additionally, one or more key fields 34 may receive wildcard values which match ranges of values and/or all possible values.

In some embodiments of the invention, different sets of parameters are used in defining frame groups for frames of different characteristics. In an exemplary embodiment of the present invention, frames received through a first physical port are grouped based on a first set of parameters, e.g., source and destination IP addresses, while frames received through a second physical port are grouped based on a second group of parameters, e.g., the parameters shown in FIG. 2. In some embodiments of the present invention, frames of different protocols are grouped using different sets of parameters. For example, in one embodiment, UDP frames are grouped based on source and destination IP addresses, TCP frames are grouped based on source and destination IP addresses and ports, and non-TCP non-UDP frames are grouped based on source and destination IP addresses and VLANs.

In some embodiments of the invention, some of the frames are grouped only based on the information required for routing, i.e., the destination IP address, as is now described.

Figure 6:
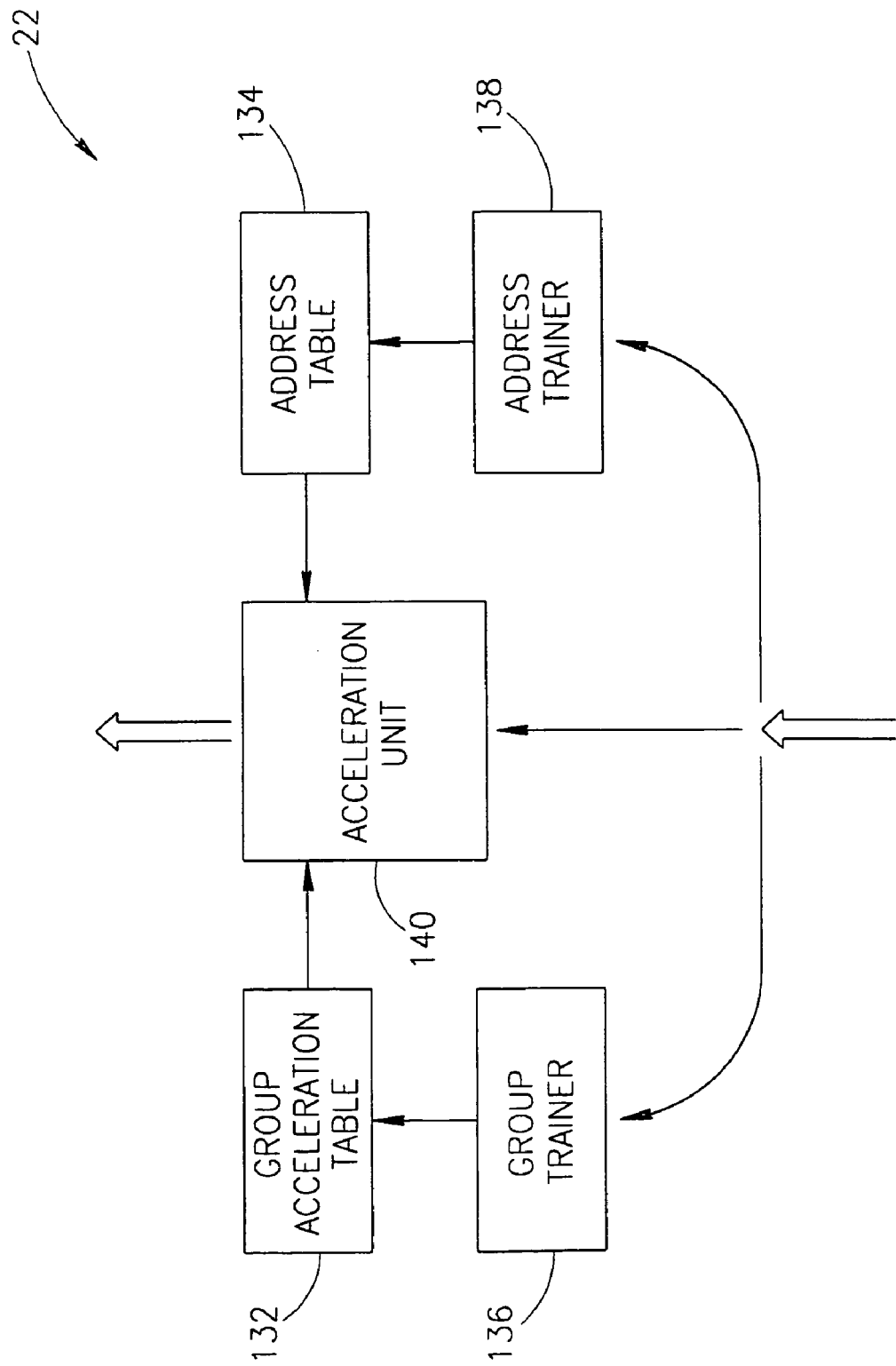
FIG. 6 is a schematic illustration of an accelerator switch, in accordance with an embodiment of the present invention.

FIG. 6 is a schematic illustration of an accelerator switch 22, in accordance with an embodiment of the present invention. Accelerator switch 22 comprises a group acceleration table 132, which has a plurality of key fields which identify specific groups of frames which have a common routing and policy behavior. Table 132 may be, for example, similar to tables 30 or 90. Accelerator switch 22 also comprises an address table 134 which correlates between IP destination addresses and matching layer-2 MAC addresses and VLANs. In some embodiments of the invention, table 132 also includes a MAC address and VLAN field 46 (FIG. 2). Alternatively, group acceleration table 132 does not include a MAC address and VLAN field 46 and the information is received when necessary from address table 134.

A group trainer 136 receives frames transmitted from router 24 and, optionally, frames transmitted to router 24 and prepares entries in group acceleration table 132, using any of the methods described above. An address trainer 138 receives ARP responses transmitted to router 24 and/or frames routed by router 24, and accordingly prepares entries in address table 134 from them. Alternatively or additionally, trainer 138 uses information from other packets passing through the network which are not necessarily received from or directed to router 24. Such packets may include, for example, packets related to routing protocols, for example, routing information protocol (RIP) and/or open shortest path first (OSPF) packets.

An acceleration unit 140 examines frames directed to accelerated router 24 to determine whether they require access control. Frames which require access control are routed based on group table 132 if a matching entry is found. Frames which do not require access control are routed based on address table 134, if a matching entry exists. If a matching entry is not found in the table 132 and/or 134 to which the frames were compared, the frame is bridged to router 24 for routing.

In some embodiments of the invention, address table 134 comprises a single key field, i.e., the destination IP address field. Alternatively, address table 134 includes a plurality of key fields, for example, source and destination IP addresses. In this alternative, policy rules which relate to groups of frames defined by the plurality of key fields may be stated in address table 134. The policy rules stated in address table 134 are optionally configured into switch 22 by a network manager.

In some embodiments of the invention, at least some of the frames which do not require access control are first compared to group table 132, to determine whether they have a unique required policy. If a matching entry is found, the frame is forwarded accordingly. If a match is not found, the frame is compared to address table 134 and if a match is found the frame is routed accordingly. Thus, policy enforcement tasks may be applied to specific groups of frames even if the frames belong in general to a category which does no require access control. For example, the specific groups may be assigned a specific QoS, while the remaining frames of the category are forwarded with a default QoS.

In some embodiments of the present invention, trainer 136 creates entries in table 132, for groups of frames which do not require access control but require a non-default QoS behavior. Alternatively, trainer 136 does not create entries for frame groups which do not require access control, and these frames are considered not to require any policy enforcement.

In some embodiments of the invention, frames including packets belonging to connection based protocols, e.g., TCP, which are not leading frames of a two-way session, are considered not to require access control and therefore are routed based on address table 134. This is because non-leading packets of a packet based session would not be transmitted unless the leading packets of the session were routed by router 24.

In some embodiments of the invention, the first packet of a session, for example as identified by the ACK bit not being set and optionally the SYN bit being set, is considered a leading packet. Alternatively, the first two frames of a two-way session, for example as identified by the SYN bit being set, are considered the leading packets of a two-way session.

In some embodiments of the invention, acceleration unit 140 comprises a list of UDP ports (or a range of ports) for which frames directed to them and/or received from them are considered as requiring access control. In some embodiments, the list of ports includes the well known UDP ports, since a connection with an ephemeral (not well known) port may be established only after a preliminary connection with a well known port is used to transfer the ephemeral port number to the other end of the connection. Thus, not routing frames of the preliminary connection prevents the establishment of the connection with the ephemeral port.

In some embodiments of the invention, non-IP frames are considered as not requiring access control and are forwarded using address table 134, or a separate table for the non-IP frames.

In an embodiment of the invention, group trainer 136 does not create entries for TCP frames since, except the leading frames of TCP sessions, all the TCP frames do not require policy enforcement. Not creating entries for TCP sessions will cause the leading frames to be forwarded to router 24 while the non-leading frames will be routed by switch 22. Alternatively or additionally, group trainer 136 creates entries for TCP frames which have a non-default QoS policy, as detected from the packets routed by router 24. For example, group trainer 136 may detect the QoS with which the leading frames of a TCP session are forwarded and if the QoS behavior is different than a default QoS behavior an entry is created in group table 132. Optionally, entries in group table 132 are created for groups which require non-default QoS behavior only if the frames of the group have a substantial path to pass on the way to their destination. Thus, the number of required entries in table 132 is limited without substantially affecting the QoS of the routed frames, as the QoS is of little consequences for short distance forwarding.

In some embodiments of the invention, entries in tables 30, 90 and/or 132 are not created for frames on their way to router 24 which will not pass through switch 22 after they are routed. Thus, the number of entries in the table is limited and tables 30, 90 and/or 132 may be simpler and/or cheaper. Alternatively or additionally, other methods are used to limit the required number of entries in tables 30 or 90 while maximally utilizing the acceleration abilities of switch 22. In some embodiments of the invention, group trainer 136 limits the number of entries created in group table 132 using any of the methods described in U.S. patent application Ser. No. 09/596,003, filed Jun. 15, 2000, the disclosure of which is incorporated herein by reference, in relation to a fast path policy enforcement table of a switch. Furthermore, any of the methods described in U.S. patent application Ser. No. 09/596,003 in relation to the policy enforcement table may be used to determine which entries should be overwritten when table 132 is full.

Using some or all of the above methods for limiting the size of the table of switch 22, allows accelerator switch 22 to route substantially all the frames it can learn how to route, while utilizing a relatively small table. In some embodiments of the invention, the table of switch 22 has room for fewer than 1000 entries, optionally fewer than 500 entries. The decision of how many entries are included in the table of switch 22 is optionally made based on statistical measurements of the number of sessions of different types which accelerator switch 22 is expected to handle concurrently, such that the chances of accelerator switch 22 needing to create an entry when all the entries of the table are full is beneath a predetermined level. In some embodiments of the invention, the number and nature of the alternative methods used to reduce the number of entries in the table, is chosen based on the size of the table used.

Generally, the cost of producing and/or managing group table 132 is larger, per entry, than address table 134. Furthermore, the number of entries required in group table 132 is much larger than required in address table 134, for average traffic loads passing through switch 22. By using address table 134 for routing at least some of the frames, the cost of switch 22 may be reduced.

In some embodiments of the invention, accelerator switch 22 tracks and discards error messages, e.g., ICMP messages, which are sent responsive to arrival of non-leading frames of connection-based sessions to a port of a computer which is not in the established state. This prevents the transmission of ICMP messages which may give away information on the destination computer in response to packets sent in accordance to screening methods used by hackers.

In some embodiments of the invention, a system manager may configure, into accelerator switch 22, rules pertaining to groups of frames which should not be routed by the accelerator switch. Alternatively or additionally, the configured rules pertain to other policy enforcement acts, such as QoS, sniffing and/or counting. Before creating an entry in group table 132 and/or in address table 134, the respective trainer 136 or 138 consults the rules to determine whether the entry is to be created and/or whether to add a limitation and/or QoS act to the entry. Alternatively or additionally, the system manager may indicate addresses for which routing may be performed only using group table 132 and not using address table 134.

In some embodiments of the invention, accelerator switch 22 communicates with router 24 to receive information on the policy enforcement it performs. For example, router 24 may notify switch 22 which frame groups require counting and/or sniffing.

In some embodiments of the invention, one or more of the methods described above are implemented in a layer-2 switch which does not perform routing. For example, the layer-2 switch may learn from frames routed by router 24 which QoS the frame deserves. The entries of table 30 are then used to define the frame group of the frame and state the corresponding QoS of the group. Frames received by the switch are compared to table 30 and if a match is found, the QoS of the matching entry is tagged to the frame. Consequently, the QoS is assigned to the frame at an earlier stage, resulting in faster handling of urgent packets.

It is noted that although the above description refers to a single accelerated router 24, the present invention may be used to accelerate a plurality of routers which may be adjacent each other or may be distributed throughout a layer-2 network, e.g., a local area network. In some embodiments of the invention, switch 22 lists the frames received from the different routers in the same table. Alternatively or additionally, switch 22 includes different tables for some or all of the different routers. The different tables may include the same or different key fields 34.

In some embodiments of the invention, switch 22 routes packets even if they are not directed to router 24, provided they require routing. In an exemplary embodiment of the invention, switch 22 determines whether an entry exists for the received frames regardless of whether the layer-2 destination of the frame (for example as determined from the layer-2 (e.g., MAC) destination address of the frame), is router 24. If a matching entry is found, switch 22 determines whether the MAC address of the frame matches the IP address of the frame, i.e., the MAC address of the frame is the MAC address of the frame's destination. If the MAC address of the frame does not match the IP address of the frame, the frame requires routing and is therefore routed according to the matching entry. Optionally, switch 22 checks additional conditions before routing the frame to prevent frame multiplication. Such conditions, may be as described, for example, in the above described U.S. patent application Ser. No. 09/132,030.

In some embodiments of the invention, tables 30, 90 and/or 132 include a field for storing for each entry the ultimate destination MAC address matching the destination IP address of the entry. Alternatively, in the embodiment of FIG. 6, the destination MAC address matching the destination IP address is stored in address table 134. Optionally, switch 22 listens to ARP messages passing through the switch. If the IP address referred to in an ARP message matches an entry of the table, the MAC address in the ARP message corresponding to the IP address of the message is stored in the field stating the ultimate destination MAC address of the entry.

It is noted that although the above description relates to using a table with a plurality of key fields 34 in learning to route frames based on frames routed by a neighboring router, the use of a routing table with a plurality of key fields 34 is advantageous for other reasons. For example, the use of a plurality of key fields 34 in an acceleration switch allows the switch to apply policy rules configured by a system manager and/or received from a neighboring router, to more groups of frames. That is, rules which apply equally to all the frames identified by an entry of the table can be applied by the acceleration switch in its fast path and there is no need to pass the frames to a neighboring router for handling.

It is further noted that although the above description relates to a switch which implements the invention, some embodiments of the invention may be implemented by other hardware or software bridging and/or routing devices.

It is further noted that although the present invention has been described in relation to the TCP/IP protocol suite, some embodiments of the invention may be implemented with relation to other packet based transmission protocols, such as, for example IPX, DECNET and the ISO protocols. Furthermore, although the above embodiments relate to the Ethernet link layer, the present invention may be used with substantially any layer-2 protocol including, but not limited to, Frame relay, point to point modem, ISDN, ASDL and ATM.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

What is claimed is:

1. A method of accelerating the routing of frames by an acceleration switch within a network, comprising:
   receiving, by the acceleration switch, frames directed to one of one or more routers or switches of the network;
   determining, for at least some of the received frames, whether the frames belong to a first list of frame groups, defined by values of a plurality of frame parameters; and
   routing, by the acceleration switch, at least some of the received frames, the routed frames being selected responsive to the determining;
   wherein the first list of frame groups is one of a plurality of lists of frame groups including at least one additional list of frame groups different than the first list of frame groups;
   wherein one or more frame parameters defining the groups of the at least one additional list are not the same parameters as the plurality of frame parameters which define the groups of the first list; and
   wherein the acceleration switch compares the received frames to one of the first or at least one additional lists.

2. A method according to claim 1, wherein receiving frames directed to one of one or more routers or switches comprises receiving frames which have a layer-2 destination address of one of the one or more routers or switches.

3. A method according to claim 1, wherein routing the at least some of the received frames comprises routing the frames based on, substantially only, the destination addresses of the frames.

4. A method according to claim 1, wherein routing the at least some of the received frames comprises routing the received frames using information in an entry of the first list of frame groups which matches the routed frame.

5. A method according to claim 1, wherein routing at least some of the received frames comprises routing frames which were determined to belong to a group in the first list.

6. A method according to claim 1, comprising bridging frames which were determined not to belong to a group in the first list according to their layer-2 information.

7. A method according to claim 1, wherein determining for at least some of the received frames comprises determining for substantially all the received frames.

8. A method according to claim 1, wherein determining, for at least some of the received frames comprises determining for frames which may require access control.

9. A method according to claim 8, wherein determining, for at least some of the received frames comprises determining for frames of a connectionless protocol.

10. A method according to claim 8, wherein determining, for at least some of the received frames comprises determining for frames directed to well known UDP ports.

11. A method according to claim 1, wherein the first list of frame groups comprises a list of groups which include frames routed by one or more routers or switches of the network.

12. A method according to claim 11, wherein the first list of frame groups comprises a list of groups which include frames recently routed by one or more routers or switches of the network.

13. A method according to claim 1, wherein the first list of frame groups comprises information extracted from frames having as their layer-2 source address an address of one of the one or more routers or switches.

14. A method according to claim 1, wherein the first list of frame groups comprises information extracted from frames having as their layer-2 destination address an address of one of the one or more routers or switches.

15. A method according to claim 1, wherein the first list of frame groups lists only groups including frames transmitted to and received from the one or more routers or switches.

16. A method according to claim 1, wherein the plurality of parameters which define the frame groups comprise at least two parameters not required in order to perform the routing.

17. A method according to claim 1, wherein the plurality of parameters which define the frame groups comprise an IP destination address and at least one parameter in addition to the IP destination address.

18. A method according to claim 1, wherein the plurality of parameters which define the frame groups comprise the source port or destination port of the frames.

19. A method according to claim 1, wherein the plurality of parameters which define the frame groups comprise the protocol of the frames.

20. A method according to claim 1, comprising:
determining, for at least some of the received frames, whether the frames belong to a group in the at least one additional list of frame groups;
routing, by the acceleration switch, at least some of the received frames, the routed frames being selected responsive to the determining of whether the frames belong to a group in the at least one additional list.

21. A method according to claim 20, wherein the groups of the at least one additional list are defined by one or more parameters required for routing the frames.

22. A method according to claim 21, wherein the one or more parameters which define the groups of the at least one additional list comprise only a destination address of the frames.

23. A method according to claim 20, wherein determining, for at least some of the received frames, whether the frames belong to a group in the at least one additional list comprises determining for frames which do not require access control.

24. A method according to claim 20, wherein determining, for at least some of the received frames, whether the frames belong to a group in the at least one additional list comprises determining for non-leading frames of a connection based protocol.

25. A method according to claim 20, wherein determining, for at least some of the received frames, whether the frames belong to a group in the at least one additional list comprises determining for frames directed to any of a predetermined group of ports.

26. A method according to claim 20, wherein at least some of the received frames are compared to the first list to determine whether the frame belongs to a group in the first list and if no match is found are compared to the at least one additional list.

27. A method according to claim 20, wherein routing the at least some of the received frames responsive to the determining of whether the frames belong to a group in the at least one additional list comprises routing the received frames using information in an entry of the additional list of frame groups which matches the routed frame.

28. A method according to claim 1, wherein the acceleration switch determines to which list to compare the received frames responsive to the physical port through which they are received by the switch.

29. A method according to claim 1, wherein the acceleration switch determines to which list to compare the received frames responsive to the router or switch to which they are directed.

30. A method according to claim 1, wherein the acceleration switch determines to which list to compare the received frames responsive to the protocol to which they relate.

31. A method of accelerating the routing of frames by an acceleration switch within a network, comprising:
providing, in the acceleration switch, a plurality of lists of groups of frames used for routing;
receiving, by the acceleration switch, frames directed to one of one or more routers or switches of the network;
comparing at least one of the received frames to at least one of the plurality of lists; and
routing, by the acceleration switch, received frames for which a match was found in the comparison;
wherein providing the plurality of lists comprises providing lists which use different sets of parameters in defining groups of frames; and
wherein comparing at least one of the received frames to at least one of the plurality of lists comprises determining to which of the at least one of the plurality of lists to compare each frame responsive to the value of one or more fields of the frame.

32. A method according to claim 31, wherein comparing at least one of the received frames to at least one of the plurality of lists comprises comparing at least one of the received frames to a plurality of the lists.

33. An acceleration switch comprising:
at least one table which lists groups of frames defined by a plurality of parameters of the frames;
a table trainer which creates entries in the at least one table responsive to frames received by the switch;
a comparator which determines whether the frames belong to one of the groups in one or more of the at least one table; and
a routing unit which routes frames directed to at least one router or routing switch for which the comparator found a matching group in the one or more of the at least one table;
wherein the at least one table comprises a plurality of tables which define groups of frames based on different sets of one or more parameters of the frames; and
wherein the comparator selects the one or more of the at least one table to which a frame is compared responsive to a type of the frame.

34. A switch according to claim 33, wherein the table trainer creates entries in the at least one table responsive to frames received from the at least one router or routing switch.

35. A switch according to claim 33, wherein the table trainer selects frames to be used in creating entries in the at least one table responsive to at least the source MAC address of the frames.

36. A switch according to claim 33, wherein the table trainer selects frames to be used in creating entries in the at least one table irrespective of the destination MAC address of the frames.

37. A switch according to claim 33, wherein the type of the frame is determined responsive to a protocol of the frame.

38. A switch according to claim 33, wherein the type of the frame is determined responsive to a VLAN of the frame.

39. A communication network, comprising:
at least one router; and
at least one router acceleration switch as in claim 33.

40. A method for creating an acceleration routing table, comprising:

receiving frames which include routing data:

determining, responsive substantially only to information within the received frames, whether frames routed based on the routing data of the received frames may violate policy rules; and creating entries in an acceleration routing table based on routing data which may not cause violation of policy rules according to the determination, wherein entries are not created based on routing data which may cause violation of policy rules according to the determination;

wherein determining whether frames routed based on the routing data may violate policy rules comprises determining whether the received frames carrying the routing data were routed by a neighboring router.

41. A method for creating an acceleration routing table, comprising:

receiving frames which include routing data;

determining, responsive substantially only to information within the received frames, whether frames routed based on the routing data of the received frames may violate policy rules; and creating entries in an acceleration routing table based on routing data which may not cause violation of policy rules according to the determination, wherein entries are not created based on routing data which may cause violation of policy rules according to the determination;

wherein determining whether frames routed based on the routing data may violate policy rules comprises determining that frames routed based on the routing data will not violate policy rules for frames which were routed by a neighboring router.

* * * * *

UNITED STATES PATENT AND TRADEMARK OFFICE
CERTIFICATE OF CORRECTION

PATENT NO.         : 6,980,549 B1                                   Page 1 of 1
APPLICATION NO. : 09/653656
DATED              : December 27, 2005
INVENTOR(S)       : B. Rodrig et al.

It is certified that error appears in the above-identified patent and that said Letters Patent is hereby corrected as shown below:

On the cover page, item (73), delete the Assignee from:

Avaya Technology Corp., Basking Ridge, NJ (US)

to:

Avaya Communication Israel Ltd., Tel Aviv, Israel

Signed and Sealed this

Sixth Day of March, 2007

JON W. DUDAS
*Director of the United States Patent and Trademark Office*